(12) United States Patent
Matsubara (10) Patent No.: US 7,215,640 B2
(45) Date of Patent: May 8, 2007

(54) METHOD AND APPARATUS FOR PATH CONFIGURATION IN NETWORKS

(75) Inventor: Daisuke Matsubara, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 1105 days.

(21) Appl. No.: 10/192,971

(22) Filed: Jul. 11, 2002

(65) Prior Publication Data

US 2004/0008687 A1 Jan. 15, 2004

(51) Int. Cl.
*H04J 1/16* (2006.01)

(52) U.S. Cl. ..................................... 370/235

(58) Field of Classification Search ........ 370/229–232, 370/235, 351, 389, 395.21, 400; 709/227–229
See application file for complete search history.

(56) References Cited

U.S. PATENT DOCUMENTS

| | | | |
|---|---|---|---|
| 5,115,495 A | | 5/1992 | Tsuchiya et al. |
| 5,233,604 A | * | 8/1993 | Ahmadi et al. ............. 370/238 |
| 5,435,003 A | | 7/1995 | Chng et al. |
| 5,563,878 A | | 10/1996 | Blakeley et al. |
| 5,613,069 A | | 3/1997 | Walker |
| 5,721,820 A | | 2/1998 | Aball et al. |
| 5,751,971 A | | 5/1998 | Dobbins et al. |
| 5,764,914 A | | 6/1998 | Goto et al. |
| 5,933,425 A | | 8/1999 | Iwata |
| 6,094,682 A | | 7/2000 | Nagasawa |
| 6,130,892 A | | 10/2000 | Short et al. |
| 6,141,738 A | | 10/2000 | Munter et al. |
| 6,249,820 B1 | | 6/2001 | Dobbins et al. |

(Continued)

OTHER PUBLICATIONS

*Multiprotocol Label Switching Architecture*, by E. Rosen, A. Viswanathan and R. Callon, Network Working Group RFC 3031; The Internet Society, Jan. 2001.

*Primary Examiner*—Dmitry Levitan
(74) *Attorney, Agent, or Firm*—Sughrue Mion, PLLC; Joseph Bach (57) ABSTRACT

For on-demand Quality of Service (QoS) transmission of packets, edge nodes update a TERMINAL-PORT TABLE as terminals log-on and then pass their node ID to each terminal that logged on. The nodes establish Quality of Service (QoS) assured pre-set paths through the WAN with conventional IP routing and accordingly update their NODE-PATH TABLE to provide links between the pre-set paths, network resources upon which the QoS of the paths depend and identification of a last-hop node, without the need for identification of each destination terminal of the paths. An application level connection between source and destination terminals, using conventional IP routing, provides the source terminal with identification of the last-hop node that is coupled to a destination terminal. The source terminal provides the first-hop node the last-hop node ID, the destination ID and flow information. The first-hop node creates its FLOW-PATH TABLE and transmits the information to the last-hop node, which creates its FLOW-PORT TABLE. The last-hop and first-hop nodes send acknowledgements to the source terminal. As a part of creating the FLOW-PATH TABLE, the NODE-PATH TABLE is searched and a QoS path extracted based upon the request and the last-hop node ID. Then packets are sent from the source terminal to the destination terminal over the designated path. Thereby, nodes do not need to link pre-set paths to destination terminals prior to receiving a request for a QoS path, which reduces network storage capacity requirements and computational load as compared to a conventional pre-set path system.

20 Claims, 5 Drawing Sheets

U.S. PATENT DOCUMENTS

| | | |
|---|---|---|
| 6,256,295 B1 | 7/2001 | Callon |
| 6,266,706 B1 | 7/2001 | Brodnik et al. |
| 6,275,492 B1 | 8/2001 | Zhang |
| 6,400,681 B1 * | 6/2002 | Bertin et al. .................. 370/218 |
| 6,594,265 B1 * | 7/2003 | Etorre et al. ............ 370/395.51 |
| 2001/0023443 A1 * | 9/2001 | Fichou ........................ 709/227 |

* cited by examiner

METHOD AND APPARATUS FOR PATH CONFIGURATION IN NETWORKS

RELATED APPLICATION

The present invention relates to the commonly assigned application METHOD AND APPARATUS FOR PROVIDING A QUALITY OF SERVICE PATH THROUGH NETORKS, filed on Mar. 22, 2001, by inventors, Daisuke Matsubara, Satoshi Yoshizawa and Kenichi Otsuki.

FIELD OF THE INVENTION

The present invention relates to pre-set paths in a network for meeting demands for Quality of Service.

BACKGROUND OF THE INVENTION

Wide Area Networks, particularly the Internet, has been suffering from storage and computational overloads of increased traffic, which problems are growing at an alarming rate.

A resource reservation protocol (RSVP) requires that reservation and confirmation of a network resource occur on every node through which data will pass, every time a connection is made, which will tend to create long delays while a connection is being established. In RSVP and MultiProtocol Label Switching (MPLS) networks, as the network grows in size, the number of connections and the number of transactions for the reservation that a node must handle will grow, which will require a correspondingly large computational power at each node, and the network may be unable to handle the necessary connections and transactions.

Recently, applications running on Internet Protocol (IP) infrastructure are evolving to require high-bandwidth and real-time transfer of data. To differentiate these high-demand applications from conventional applications such as e-mail downloads and WEB page transactions, a virtual path (simply "path" hereafter) that guarantees Quality of Service (QoS) attributes, such as bandwidth, delay and jitter, can be used. The sender of the data specifies the path on which the data flow will be allocated and then sends the data on that path to have a guaranteed QoS.

One prior art method establishes pre-set paths, for example as set forth in U.S. Pat. No. 6,108,304, to Hajime et al, dated Jun. 8, 1998. The pre-set path is established between a first-hop node and a last hop node of a Wide Area Network (WAN), such as the Internet, and can be used for any path that starts from a terminal that directly connects to the first-hop node and ends at a terminal that directly or indirectly connects to the last-hop node. The many terminals that directly connect to the first-hop node and the last-hop node can share the pre-set paths when establishing their own paths.

As used herein, Edge nodes of the network, edge nodes of sub-networks, edge nodes of work-groups, and gateways are examples of a first-hop node and a last-hop node of a Wide Area Network, which are in contrast to transit nodes that are along the path between the first-hop node and the last-hop node.

Routing information is exchanged between the first-hop node and the last hop node of a Wide Area Network in IETF, Multi-protocol Label Switching Architecture, RFC3031, January 2001. The first-hop node needs a path table linking the IP address of the destination terminal to a pre-set path. The source terminal sends a packet with a destination IP address to the first-hop node. The first-hop node uses the destination IP address to extract a path from its path table and then sends the packet through the selected pre-set path.

U.S. Pat. No. 5,933,425, issued to Iwata on Aug. 3, 1999, selects a first path to a destination in response to a connection request that specifies multiple Quality of Service (QoS) parameters. If the transmission of the first signal along the first path is unsuccessful, then a second path is selected according to a database. The pre-set paths are kept current as to QoS.

U.S. Pat. No. 6,094,682, issued to Nagasawa on Jul. 25, 2000, specifies a pre-set path that is available at log-on of a terminal. The originating network element, which is the starting point of a path, transmits a path trace value to the next network element, which path trace value has an identifier of the element which transmits the path trace value. The receiving element changes the identifier of the path trace value to its own identifier and retransmits the modified path trace value to the next element, etc. up to an end point. Each element holds cross-connect information and transmits to a network management system that constructs paths using the cross-connect information.

U.S. Pat. No. 5,751,971, issued to Dobbins et al on May 12, 1998, has multiple router interfaces assigned the same IP network address, creating an IP work group and allowing a host to be relocated anywhere in the work group without requiring reconfiguration of the host. A single address is used for several physical networks.

U.S. Pat. No. 6,256,295 B1 to Callon, dated Jul. 3, 2001, has a system for determining a plurality of minimally-overlapping paths between a source node and a destination node in a network. If the first path and the second path overlap, the system modifies at least one path to minimize the overlap of the paths to lessen the likelihood that a failure in one path will cause a failure of the other path.

There is a need for an improved set-up of QoS paths.

SUMMARY OF THE INVENTION

These and other needs are addressed by the present invention.

As a result of analyzing the prior art, the inventor has found a need for decreasing the computational load and storage requirements on a network in handling requests for QoS paths.

Therefore, the present invention analysis of the prior art system as to its problems and their causes has lead to the need for a more effective handling requests for QoS paths.

It has been thought, prior to the present invention, that accomplishing all of the path set-up procedures before any request for a QoS path is received is the ultimate way to implement QoS.

The present invention has identified a problem that the pre-set path approach requires the first-hop node to store and manage a path table that includes pre-set paths for every terminal in the network, which requires management of a very large table. The management will become even more extensive rapidly as the demand for QoS paths grows, which is expected. An analysis according to the present invention shows that when the last-hop node of a destination terminal changes, every first-hop node that manages a pre-set path table for that destination terminal must change such pre-set path accordingly, which is one cause for an increased load on the nodes. The problem becomes worse as the location of the terminals changes frequently, because the path table of every first-hop node must be updated every time the last-hop node of the destination terminal changes. The present invention solves the problem identified by analyzing the problem, determining a major cause and eliminating this cause, particularly by associating a last-hop node and destination terminal for pre-set paths only after there is a request for a QoS path involving the destination terminal.

Subnet IP addresses may be used to aggregate terminals, but the problem still remains. When the terminal subnets are divided into small groups and the number of subnets becomes larger, the tables become immense.

The present invention solves the problems by linking the destination device (edge node of a subnet, LAN, MAN, etc. or a terminal) to one or more pre-set node to node paths in response to the process of QoS path selection that started with a specific request for a QoS path to a named destination device.

The embodiment uses pre-set paths, but the first-hop node does not store a path table for each destination device. Instead, the first-hop node stores path tables that indicate pre-set paths for each last-hop node. The source device for a QoS path request, for example a subnet edge node or a terminal, sends a request signal to the first-hop node indicating flow information of the data flow desired and the destination terminal to which the path should extend. In response, the first-hop node allocates the flow to a designated path according to the following features:

1) The first-hop node stores a table that links each last-hop node to each path, a node-path table.
2) The Source and destination devices acquire first-hop/last-hop node IDs.
3) The destination device sends its last-hop node ID to the first-hop node, in response to the QoS path request.
4) The specific request is associated with the last-hop node ID, at the destination device or first-hop node.
5) The first-hop node extracts a pre-set path from the node-path table using the last-hop node ID and notifies the source device of the request status.

The above solution of the present invention provides all of the advantages of the prior art pre-set paths for satisfying subsequent QoS requests and in addition alleviates the prior art problems relating to the prior art huge demands on computational and storage resources of the networks in handling the rapidly increasing use of QoS paths.

Still other aspects, features, and advantages of the present invention are readily apparent from the following detailed description, simply by illustrating a particular embodiment and implementation, including modifications and variations, which is the best mode contemplated by the inventor for carrying out the present invention. The present invention is also capable of other and different embodiments, and its several details can be modified in various obvious respects according to the teachings herein, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawing, in which like reference numerals refer to similar elements, and in which.

DESCRIPTION OF THE PREFERRED EMBODIMENT

Figure 1:
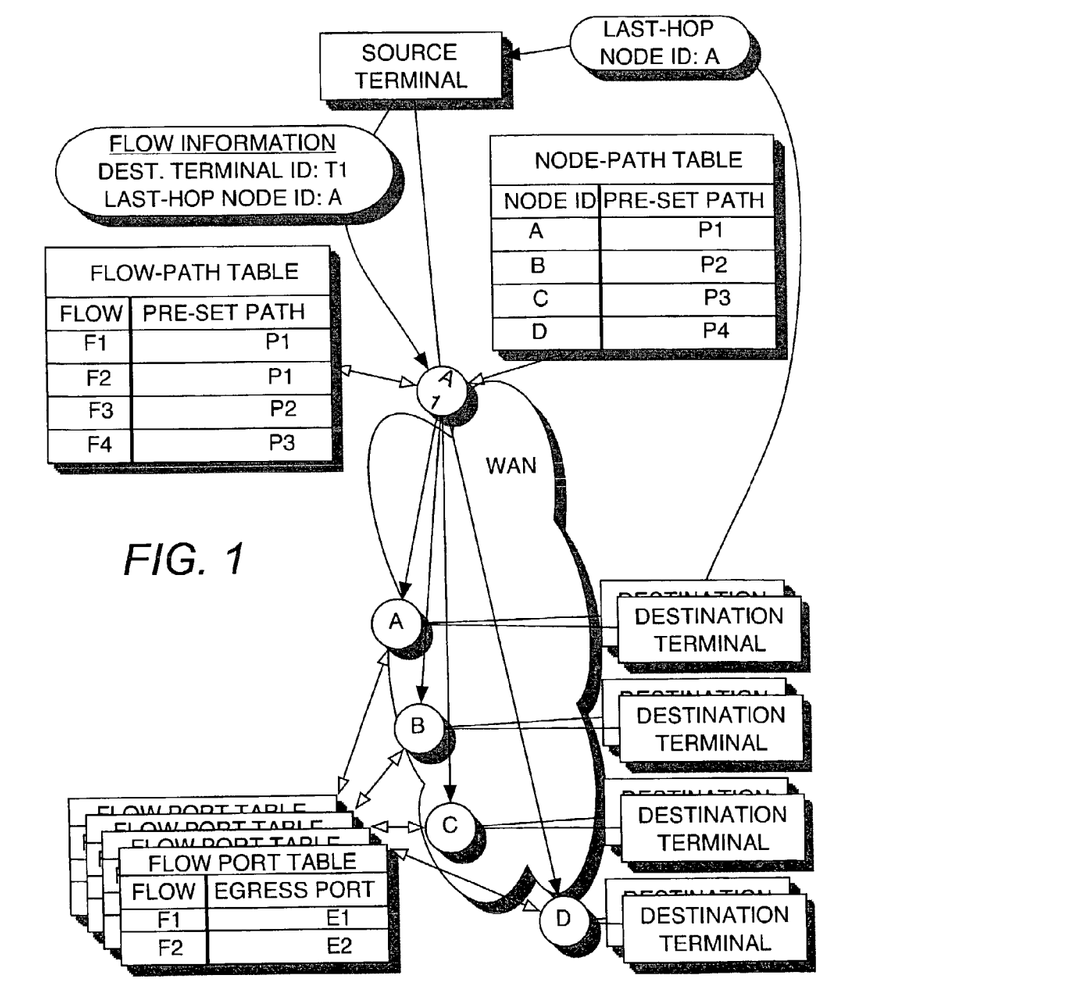
FIG. 1 is a schematic of a network, particularly a WAN, and example terminals connected to the network, with example tables stored at first-hop and last-hop nodes of a QoS path that is to be allocated on-demand, according to the embodiment of the present invention.

There is an increasing demand on networks, for example the WAN of FIG. 1, to deliver QoS for applications such as interactive video communication and high quality video distribution. Multi Protocol Label Switching (MPLS) sets up dedicated paths across the network to achieve QoS. Each packet, of a packet switching network, has a destination identifier, herein referred to as the destination machine ID. As a network grows, the MPLS paths grow in number.

Figure 2:
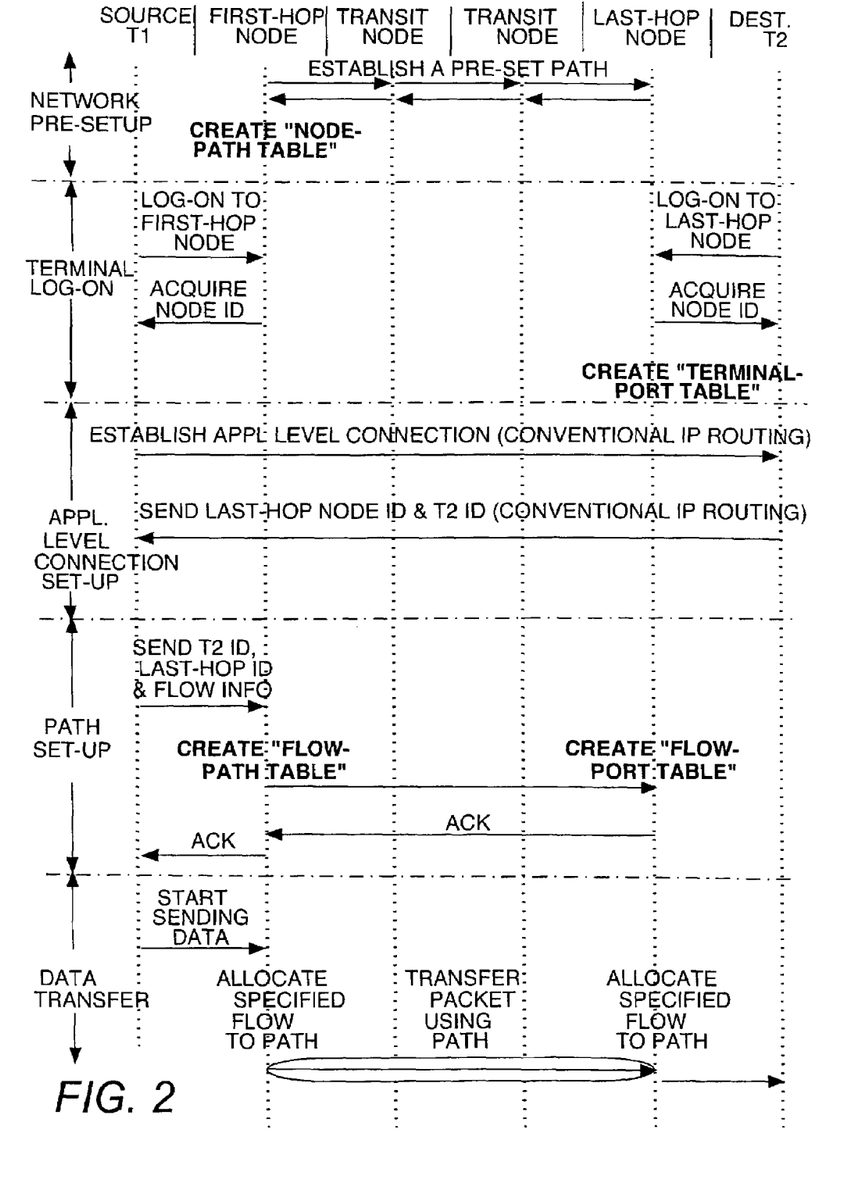
FIG. 2 is a chart of signals transmitted and received by the nodes of the WAN of FIG. 1, the source terminal of FIG. 1 and the destination terminal of FIG. 1, with a representative order of the signals as they occur extending from top to bottom, for implementing the embodiment of the present invention.
Figure 3:
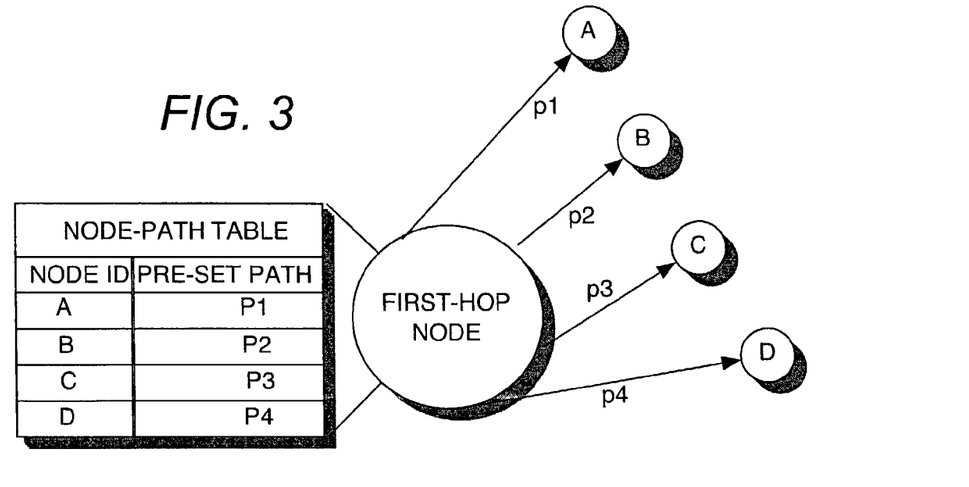
FIG. 3 is an example FIRST-HOP NODE TABLE, with exemplary data, residing in storage media at the edge nodes and used with the edge node operating as a first-hop node in FIG. 1, for implementing the embodiment of the present invention.
Figure 4:
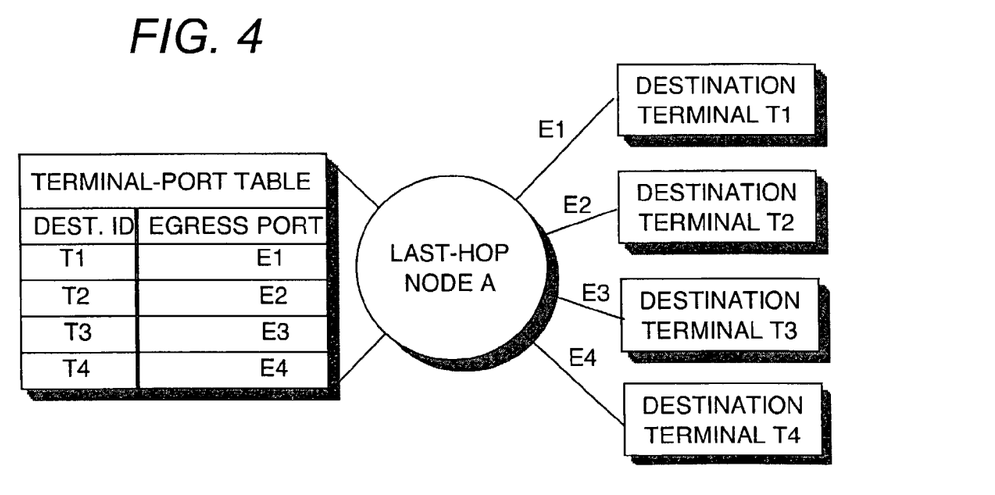
FIG. 4 an example TERMINAL-PORT TABLE, with exemplary data, residing in storage media at the edge nodes and used with the edge node operating as a last-hop node in FIG. 1, for implementing the embodiment of the present invention.

The embodiment of the present invention employs a network pre-setup phase as shown in FIG. 2, as a part of an on-demand Quality of Service (QoS) service. The network pre-setup phase may be according to the prior art, for example the prior art mentioned in the Background and as disclosed in the commonly assigned application METHOD AND APPARATUS FOR PROVIDING A QUALITY OF SERVICE PATH THROUGH NETORKS, filed Mar. 22, 2001, by inventors, Daisuke Matsubara, Satoshi Yoshizawa and Kenichi Otsuki. The basic path setting technique of that application sill be set forth now, particularly with respect to FIGS. 5 and 6 of this application.

The network includes nodes (gateways, terminals, edge nodes, transit nodes, switches, etc.) coupled by links (trunks, lines, etc.) for in-line communication, a network management system (NMS) and a trunk management system (TMS). The TMS and the MMS function as reserve "resources" within the network, whereby the links of the network are identified as having a particular data handling capability (e.g., 100 Mbps). Then, the data handling capability of each link is assigned, either in whole or in part, to the nodes, which manage data communicating and admission to the network, based upon the node data handling capability.

The TMS includes a processor coupled to a memory by a system bus, not shown but implied for the nodes A1, A, B, C, D of FIG. 1. The memory holds various tables, including a TMS provisioned table, a TMS trunk table, a TMS trunk status table, and a TMS path table. Tables are disclosed in detail herein only when necessary for an understanding of the present invention, and other conventional tables are not disclosed so as not to obscure the invention with unnecessary details.

The edge or gateway nodes A1 and A are used to implement the network pre-setup phase and comprise a control program in storage that provides the intelligence of the node and is executed by the conventional node processor to manage information received from the NMS in a number of tables, including a node path table, a node trunk table, a node interface status table and a node trunk status table. The node interface table identifies the different interfaces of the node that connect to network links, such as the access network associated with the node.

Messages (packets) originating from a network source machine bound for a destination machine are provided header information used by a node to assign network resources and a path through the network.

The embodiment of the present invention employs a network pre-setup phase as shown in FIG. 2, as a part of an on-demand Quality of Service (QoS) service. The network pre-setup phase may be according to the prior art, for example the prior art mentioned in the Background and as disclosed in the commonly assigned application METHOD AND APPARATUS FOR PROVIDING A QUALITY OF SERVICE PATH THROUGH NETWORKS, filed Mar. 22, 2001, by inventors, Daisuke Mataubara, Satoshi Yoshizawa and Kenichi Otsuki. The basic path setting technique of that application will be set forth now, particularly with respect to FIGS. 5 and 6 of this application.

The network includes nodes (gateways, terminals, edge nodes, transit nodes, switches, etc.) coupled by links (trunks, lines, etc.) for in-line communication, a network management system (NMS) and a trunk management system (TMS). The TMS and the NMS function as reserve "resources" within the network, whereby the links of the network are identified as having a particular data handling capability (e.g., 100 Mbps). Then, the data handling capability of each link is assigned, either in whole or in part, to the nodes, which manage data communicating and admission to the network, based upon the node data handling capability.

The NMS controls the first-hop, last-hop and transit nodes to set the data communication characteristics of their outputs, in effect setting path or link bandwidth as a communication class (for this example class A). Using conventional differential service (DiffServ) architecture, or other QoS implementations, the output queues and associated queue control circuitry is set to have the nodes classify, mark, police, shape and prioritize packets. Thereby, the NMS allocates a particular bandwidth to each direction specific link. Such links are referred to as "Provisioned Links." A Provisioning Table identifies each provisioned link by the two nodes it connects. In the table, each link is assigned communication characteristics, for example, a bandwidth.

The distribution of resources by the TMS results in providing each node with pre-set paths, each of which contains network links that are provisioned with a particular bandwidth. A Node Path Table is maintained by each node to contain the bandwidth of each of its provisioned links. To distribute the bandwidth for direction specific provisioning for each node may require partitioning the bandwidth on some links three, less than three, four or even more than four ways, depending upon the paths established by the NMS and TMS during network pre-setup.

The TMS, after allocating resources to the network links and then distributing those resources to the nodes, creates and maintains a TMS Path Status Table for each node, which has columns of: each path managed by such node; the Provisioned Link identification of each path; the bandwidth of each path; whether or not each path is used; and the amount of unused bandwidth available for that path.

Node Path Status Tables are maintained by each of the nodes to contain essentially the same information as the TMS Path Status Table, except for each node only. Also, the network link that became a Provisioned Link when allocated a resource by the TMS is identified.

The Node Trunk Status Tables will change continually, because the communications handled by each node will be changed. Communications through the nodes start and stop, changing the amount of "Available" and "Used" resource as stored in the tables for the paths, according to which paths are used. In addition, the path status information is periodically sent to the TMS so that it can change its TMS Path Status Table to also reflect the status of the various node paths. However, the information of the TMS Path Status Table may lag that of the Node Path Status Tables by an amount that depends upon how soon and how often status information is sent to the TMS. For example, a node may send path status information just after it modifies its own Node Trunk Status Table, or it may send status information on a less frequent basis, such as after predetermined periods of time, or it may send the information on some other keying event.

Each node may connect to more than one network as a gateway or may have multiple connections to one network and, as a result, have an interface for each of the connections. A Node Flow-Path Table is created and maintained by each node to identify the resource of each interface, namely: the bandwidth; the amount of the bandwidth that is used; and the amount of the unused bandwidth still available. This information is similar to the information that is kept for the paths in the Node Path Status Tables for each node.

Figure 5:
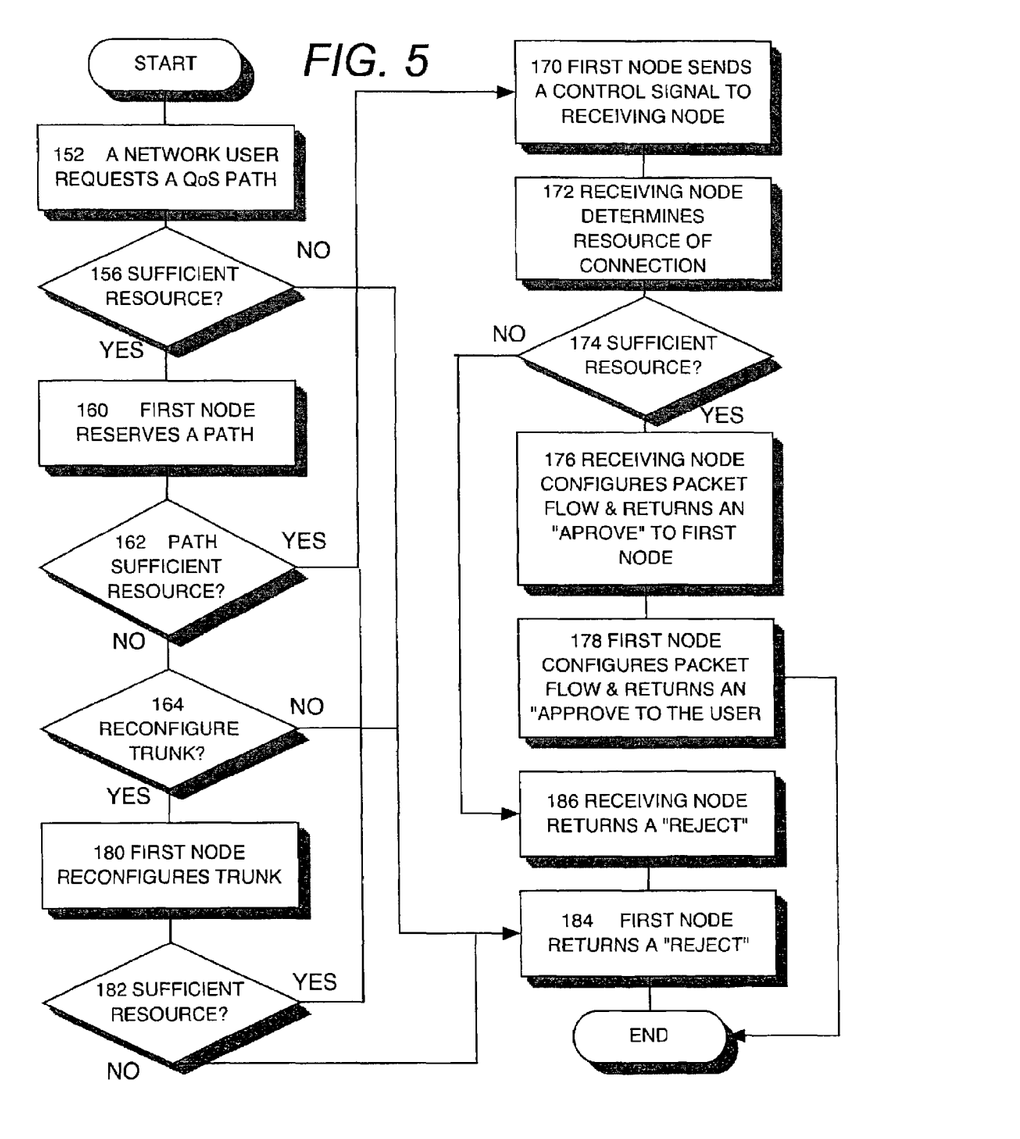
FIG. 5 is an flow diagram illustrating the steps taken by a first-hop node or subsequent-hop node in a network to set-up a QoS path in the network, operating in the network pre-setup phase of the present invention as disclosed in FIG. 2.

The allotted bandwidth of each node is used when a source machine requests and is granted a QoS data transfer, thereby creating a data communication path for as long as the transfer takes, as shown in FIG. 5, which is a flow chart of a representative method of performing THE PATH SET-UP phase of Figure.

Step 152, FIG. 5: A request for a QoS path is received by the first-hop node A1 of FIG. 1 as a first communication of the path set-up phase of FIG. 2, from a device or network entity (i.e. the source machine, which is the source terminal of FIG. 1 and FIG. 2) coupled to the first-hop node. The request will be for characteristics of the path, such a bandwidth, class, etc, (flow information) and includes the destination terminal ID and last-hop node ID.

Step 156, FIG. 5: The first-hop node searches the node Flow-Path Table and determines if it has the resources available at interfaces that connect to the network to grant the request. If not, the procedure will branch from step 156 to step 184 where the node returns a "reject" to the requestor (source machine) and then the procedure ends. If, however, there is sufficient interface resource available, the procedure will move to step 160.

Step 160, FIG. 5: The first-hop node reserves the interface resource in anticipation of granting the request, and then the node searches its Flow-Path Table to find a pre-set path or paths to the destination machine corresponding to the destination IP address of the request. Once the pre-set path is found, the procedure passes to step 162.

Step 162, FIG. 5: The node determines if the path has the resource needed to match that of the request. With multiple paths available, the first-hop node checks the resources of all the paths. If no path is found with the requested resource, the procedure moves to step 164. If a path is found with the requested resource, the procedure moves to step 170.

Step 164, FIG. 5: The first-hop node determines if a path reconfiguration procedure (described more fully below with reference to FIG. 6) should be performed. A yes result moves the procedure to step 180 and a no result moves the procedure to step 184 where the first-hop node returns a "reject" to the requestor and then the procedure ends. The decision for a path reconfiguration may be limited during initialization (e.g., set to only make a certain number of requests per unit of time), or based upon resource status.

Step 180, FIG. 5: A path reconfiguration attempts to temporarily re-allocate bandwidth to one or more of the Provisioned Links of the desired path.

Step 182, FIG. 5: If insufficient resource is recovered by the path reconfiguration of step 180, the procedure passes to step 184 where the first-hop node returns a "reject" to the requester (source terminal) and then the procedure ends. If the path reconfiguration process does obtain sufficient resource, the procedure will proceed to step 170, described below.

Step 170, FIG. 5: After the first-hop node grants the request and reserves the resource and path, the first-hop node sends a control signal to the last-hop node and notifies the last-hop node of the request.

Step 172, FIG. 5: The last-hop node checks its associated Terminal Port Table to determine the resource to handle the communication.

Step 174, FIG. 5: If the resource is not sufficient, the procedure will move to step 186. When the resource is sufficient, the procedure passes to step 176.

Step 186, FIG. 5: The last-hop node returns a reject to the sending first node, and then the procedure passes to step 184, described above.

Step 176, FIG. 5: The last-hop node sets up the necessary configuration to mark and forward the packets pursuant to the QoS path specified in the request and set forth in the signal from the first-hop node (creates the flow-port table), and then returns an "ACK", acknowledgement, to the first-hop node.

Step 178, FIG. 5: The first-hop node sets up the configuration for marking and forwarding packets according to the QoS requirements specified in the request and then sends an "ACK" to the source terminal. The procedure will then terminate with step 190.

Thereafter, the source terminal begins the communication by sending the packets, according to the DATA TRANSFER phase of FIG. 2. When the source terminal concludes its communication, it sends a "release" message (not shown in FIG. 2), and in turn, the affected nodes will modify their tables accordingly.

Figure 6:
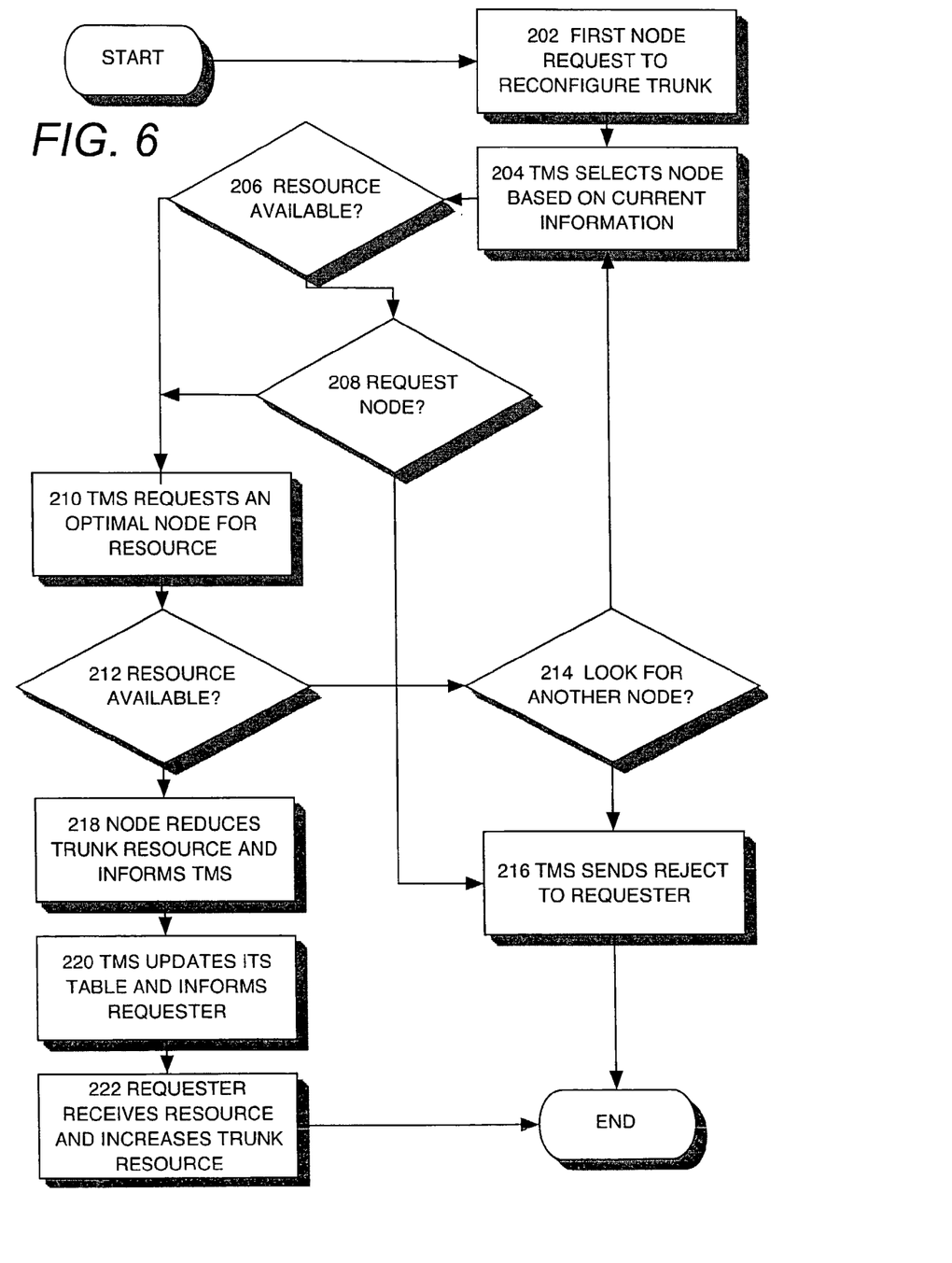
FIG. 6 is a flow diagram illustrating step 180 of FIG. 5 in more detail, for path reconfiguration in an effort to obtain a path through the network with a capacity corresponding to a QoS path request.

The major steps for path reconfiguration in step 180 of the process shown in FIG. 5 are illustrated in FIG. 6. Briefly, the path reconfiguration process, in FIG. 6, operates to locate extra resources that can be at least temporarily re-allocated to a path of a first-hop node looking for a QoS path in response to a request. That is, not having found a path with sufficient resources in any of the pre-set paths managed by the first-hop node, an effort to find a path by re-allocating the available resources of one or more paths is made by path reconfiguration.

Step 202, FIG. 6: The first-hop node sends a request to the TMS, which includes an identification of the link needing more resource (e.g., bandwidth) and the amount of bandwidth needed.

Step 204, FIG. 6: The TMS searches the TMS Path Status Table for alternate links (managed by other nodes) that share the common Provisioned Link with the path identified in the request. When there are multiple shared links for a path, any of the links are candidates for the path reconfiguration process, and one having insufficient resource for the request would be made known to the TMS by the request. Accordingly, using the Path Status Table, the TMS attempts to locate paths that share the same insufficient link as the path identified in the reconfiguration request. If more than one path is found, the TMS will select a path based upon the available resource of that path and the needs of the request.

Step 206, FIG. 6: A positive determination (yes) of a path resource available passes the procedure to step 210 and otherwise to step 208.

Step 208, FIG. 6: It is determined if the path found should be used anyway. If not, the procedure passes to step 216. As indicated above, the status information of the TMS Path Status Table may lag the status information maintained by the nodes. The amount of lag depends upon how frequently the nodes send status update information to the TMS. Thus, the decision of step 208 is made in the hope that the status available to the TMS is inaccurate and that the particular path may indeed have the resource needed. Accordingly, the request of step 210 is made anyway.

Step 216, FIG. 6: The TMS sends a "reject" message back to the first-hop node and the process ends.

Step 210, FIG. 6: The TMS sends a request to the node that manages the alternate path with an identification of the path and the amount of bandwidth needed or desired.

Step 212, FIG. 6: The node receiving the request for resources on the alternate trunk searches its associated Tables, to check the status of the requested alternate trunk. If the node determines that insufficient resources exist for that alternate path to meet the requirements of the request, the procedure passes to step 214 after the node sends a "reject" to the TMS, and otherwise the procedure passes to step 218

Step 214, FIG. 6: The TMS decides whether to try again. If so, the process returns to step 204. The decision is based, at least in part, upon the fact that two or more nodes may share the path. Even if a path managed by one node does not have sufficient resource, another may. Hence, step 214 returns to step 204 to attempt to find another path with the resource needed.

Alternatively, the criteria for the decision process used in step 214 by the TMS can be based upon a preset number of attempts at locating an alternate path with sufficient resource, or some other factor(s).

Step 218, FIG. 6: The node managing the alternate path sends the TMS an "approve," and adjusts its associated Table (reducing the amount of resource indicated in both the "Bandwidth" and the "Available" columns for the alternate trunk.

Step 220, FIG. 6: The TMS modifies its Path Status Table to reflect this re-allocation of resource. The TMS notifies the node that made the reconfiguration request that the request is granted, and modifies its Path Status Table to reflect the reconfiguration (i.e., re-allocation of resources) accordingly.

Step 222, FIG. 6: The first-hop node that sought the additional resource will also modify its Tables to reflect the added resource for the trunk in question.

Prior network configurations and architectures for packet switching, using QoS path constructions, have typically managed the resources through the network in terms of "paths" i.e., end-to-end connections. The above control manages the resources within a network in units of "links." When a sending Node creates a path, it determines if the path can be created based upon the link resource (trunk resource)

information that it manages and does not need to ask any other entity for additional information.

The NMS and the TMS could be combined as one element. A gateway element and its corresponding edge node can be integrated as a single first-hop node, which will have the gateway functions, such as signaling, resource management and admission control that are mentioned above.

The PATH SET-UP phase of FIG. 2 across the network, as explained with respect to FIGS. 5 and 6, begins with a request that is specific as to the QoS for the data transfer. The first-hop node checks if the resources are sufficient to meet the QoS needs of the request. If the resources are not sufficient, additional resources can be borrowed from other node allocations, which were made in the conventional NETWORK PRE-SETUP phase of FIG. 2, by a request for "reconfiguration" to the management system. If sufficient resources can be reallocated, the sending node permits the request; if not, the request is refused. The need to reserve and control a network resource in a network on a per connection basis is eliminated.

In FIG. 1, a simplified Wide Area Network (WAN), for example the Internet, is shown, but only with respect to a first-hop node A1 and a plurality of last-hop nodes A, B, C and D. Transit nodes (not shown) are in the network along multiple paths between the nodes shown at the edges of the network. A source device (a source terminal in the preferred embodiment of the drawing) is connected to the first-hop node, although in practice a plurality of source machines, terminals and edge nodes of subnets, for example, would be connected to the ports of the first-hop node A1. Each last-hop node is coupled to a plurality of destination machines (destination terminals in the preferred embodiment of the drawing); the destination machines may be terminals and edge nodes of subnets, for example.

In FIG. 1, each first-hop node employs a computer system, not shown in detail since it is well known and conventional. The computer system includes a computer readable storage of code, which is partially shown in schematic form to include the FLOW-PATH TABLE, NODE-PATH TABLE, TERMINAL-PORT TABLE and the FLOW-PORT TABLE as an embodiment according to the invention.

Although not shown in FIG. 1 because FIG. 1 is of the present embodiment, the prior art referred to in the Background would have an IP routing table, created in network pre-set before a request for QoS is made. The IP routing table of the prior art would have one column of IP addresses, for example, of destination terminals T1, T2, T3 in the first three rows, and another column being pre-set path identifications, for example P1, P2, P1 in the first three rows. As mentioned previously, such a prior art table is huge and becoming bigger rapidly, because of all the terminals connected to individual nodes of the network. The present invention does not require the identification of the terminals connected to the pre-set paths, only identification of the last-hop node.

The pre-set path prior art is an improvement over the prior setting up of a path at the time of a request for QoS. The present invention improves the pre-set path prior art in an unexpected way, that is by setting-up the identification of the last-hop to destination machine link of a pre-set path at the time of a specific request for a QoS path involving that destination machine. The advantages of the present invention in reducing the computational load and the storage requirements on the network are great. The following description is more specific as to the implementation of this portion of the embodiment.

In FIG. 1, each destination device employs a computer system (not shown in detail since it is well known and conventional) that includes a computer readable storage of code, which is partially shown in schematic form to include the tables of the embodiment, for example the FLOW-PORT TABLE, which relates the destination machines to their connection ports of the corresponding network node A, B, C, or D.

As shown in FIG. 2, the process of the embodiment has a first phase, which is the network pre-setup phase. The first-hop node A1 and one or a plurality of last-hop nodes, for example the last-hop nodes A, B, C and D of FIG. 1, exchange information between themselves over a static path with intervening nodes of the network WAN (the intervening nodes are shown in FIG. 2 and are implied in the network of FIG. 1), to establish pre-set paths, in a conventional manner, except that there is no need to include the destination terminals in the set-up according to the present invention. In establishing the pre-set paths, the first-hop node generates or creates the FLOW-PATH TABLE and the NODE-PATH TABLE shown in FIG. 1. Although these tables are unique to the present invention, the method used to establish pre-set paths may be one that is well known in the prior art, for example as set forth in the prior art mentioned in the BACKGROUND OF THE INVENTION, whose disclosure is incorporated herein for such purpose, including the MPLS method of Wide Area Network in IETF, Multi-protocol Label Switching Architecture, RFC3031, January 2001. Thereby, multiple paths are set-up between the first and last-hop nodes, and different paths that transit different transit nodes may then be selected. Each pre-set path may be unidirectional or bi-directional.

The next phase, in the process of FIG. 2, involves the conventional terminal log-on where the destination and source machines, e.g. terminals, connect to their respective nodes A1, A, B, C and D. As a result the destination and source devices each acquire a respective node ID. Each of the nodes create, update and otherwise manage their TERMINAL-PORT TABLE (here only the last-hop node table is relevant to the invention), which relates or links each logged-on device with the egress/ingress port to which it is coupled. Of interest to the embodiment is that each destination terminal ID is linked to an egress port of the last-hop node to which the destination terminal is connected. This phase may be accomplished when the terminals log-on to the network or when the terminals change location and connect to a different node. As to this phase, what is different with the present invention is that in the embodiment, there is no need to notify the other nodes and controls of the network that a terminal has logged-on or changed its node association.

The third phase shown in FIG. 2 is an application level connection set-up that is completely unique to this invention with respect to QoS path on-demand requests. For example, the applications residing on the source and destination machines may be for video conferencing. In a conventional manner, the source and destination machines establish an application level connection using conventional IP routing, for example using the H.323 and SIP standards. The source device requests that the destination device identify the node to which it is directly connected. In response, the destination device sends through the last-hop node and to the source terminal a message that includes the last-hop node ID and destination terminal ID, using conventional IP routing, that is, without pre-set paths. Any means of notifying the source terminal of the destination terminal ID and the last-hop node ID may be used, and the above method is merely exemplary of a means to establish the communication.

The next phase shown in FIG. 2 involves path set-up, which was explained above in detail with respect to FIGS. 5 and 6. The source terminal sends to the first-hop node a request for a QoS path, as a part of the on-demand QoS path service. The request includes the last-hop node ID and the desired destination device identification ID, for example A and T1, respectively; this step is not shown in FIG. 1. The request also includes flow information that specifies the flow characteristics, such as source IP address, destination IP address, source port number, destination port number, etc.

Using the NODE-PATH TABLE and the last-hop ID, the first-hop node decides upon the path that optimally satisfies the request and connects to the last-hop node. The first-hop node uses the information extracted from the NODE-PATH TABLE, the selected path, to create or update the FLOW-PATH TABLE of FIG. 1 that links each flow to a pre-set path. The request is transmitted by the first-hop node A1, which in the embodiment is the node to which the source device is connected, to the destination device over the internet, WAN. The destination terminal ID, last-hop node ID and flow information for the QoS path requested is sent to the first-hop node by the source device. Conventional IP routing or the selected QoS path may be used for this communication.

The last-hop node, in response, creates the FLOW-PORT TABLE shown in FIG. 1, which relates or links each flow F1, F2, etc to the associated egress port E1, E2, etc.

Thereafter, the last-hop node sends an acknowledgement (ACK) to the first-hop node that indicates its part in the process is completed to date. Upon receipt of the ACK, the first-hop node sends a similar ACK to the source device.

The next phase shown in FIG. 2 involves data transfer. The source device starts the sending of data, packet flow, to the first-hop node. Upon receipt, the first-hop node allocates the specified flow to the QoS path that was selected in the path set-up phase. Thereby, the first-hop node and transit nodes transfer the packets to the last-hop node using the designated pre-set path for the requested QoS. The last-hop node refers to the FLOW-PORT TABLE that links the flow to an egress port and transmits the data, packet flow, to the designated destination device.

Therefore, for managing transmission of data from a source terminal (machine or device) to a destination terminal (machine or device) through the WAN, the first-hop node:

updates a terminal-port table (i.e. flow-port table) of its database as terminals log-on to provide status information about machines coupled to the first-hop node and then passes on its node ID to each terminal that logged on;

establishes Quality of Service (QoS) assured pre-set paths through the WAN and updates a node-path table of its database to provide relationships between the pre-set paths through the WAN, network resources upon which the QoS of the paths depends and identification of a WAN last-hop node of each QoS path, without the need for identification of each destination terminal of the paths;

receives an application level request for an on-demand QoS assured path to a specified destination terminal from a specified source terminal and assists the applications running on the source and destination terminals to establish an application level connection using conventional IP routing, by transmitting over the WAN, an inquiry and answer for identification of the last-hop node that is coupled to a destination terminal specified in the request (the assistance being the transmitting of an application level signal to the destination terminal inquiring as to the identity of the last-hop node that is coupled to the destination terminal specified in the request and also identifying the signal as originating from the source terminal to whom the answer should be sent);

transmits to the source terminal an application level signal that identifies the last-hop node that is coupled to the destination terminal specified in the request and also identifies the signal as originating from one of the last-hop node and the destination terminal (the latter case being the preferred embodiment);

receives, from the source terminal, the identification of the last-hop node that is coupled to the destination machine;

creates its FLOW-PATH TABLE of its database and transmits the information for the last-hop node to create its FLOW-PORT TABLE of its database, and upon completion, acknowledges the completion to the source terminal;

as a part of creating the FLOW-PATH TABLE, the node-path database is searched and a QoS path is extracted based upon both the request and the identification of the last-hop node that is coupled to the destination machine; and thereafter, transfers the packets for the source terminal to the destination terminal according to the request.

Any "last-hop node" A, B, C, D may function as a first-hop node in communication with the "first-hop node" A1 functioning as a last-hop node, that is the nodes may have similar programs and tables for reversing roles, depending upon whose terminal makes the on-demand request for the QoS.

The first-hop terminal may, as a further embodiment of the invention, take over some of the application level duties performed by the source terminal and the destination terminal of the above example. The invention is usable in network service where the network comprises IP routers, for example. The invention is usable in other networks, such as the ATM (Asynchronous Transfer Mode) network, which may have a pre-set path.

With the present invention, the first-hop node does not need to store and manage information linking pre-set paths to the destination terminals. In the embodiment the first-hop node manages information linking the preset paths to the final-hop nodes, without requiring linking to a destination terminal until the request is made and a preliminary pre-set path is selected. Since the number of terminals is a large multiple of the number of last-hop nodes, this greatly reduces the required table sizes, which thereby greatly reduces the storage requirements and the database management processing load on the first-hop nodes, which are in theory all of the edge nodes of the network and all of the gateway nodes of a WAN, for example. When the destination terminal changes location and connects to a different final-hop node, the path table of the first-hop node does not need to be reconfigured. This greatly reduces the computational load of the first-hop nodes, when the location of the terminals frequently changes, and with the increased use of portable or mobile terminals, the last-hop nodes may change more frequently in the future.

While the present invention has been described in connection with a number of embodiments and implementations, the present invention is not so limited but covers various obvious modifications and equivalent arrangements, which fall within the purview of the appended claims.

What is claimed is:

1. A method that is machine performed by a first-hop node of a wide area network (WAN), for managing on-demand Quality of Service (QoS) assured pre-set path transmission of data from a source machine to a destination machine through the WAN, said method comprising the steps of:

managing a node-path database providing links between QoS assured pre-set paths through the WAN and identification of a last-hop node of each QoS path;

thereafter, receiving a message that includes identification of a specific request for a QoS assured pre-set path and the identification of the last-hop node that is coupled to the destination machine;

thereafter, searching the node-path database for QoS assured pre-set paths linked to the identified destination machine, and selecting and extracting a QoS path based upon the identification of the last-hop node that is coupled to the destination machine; and thereafter, informing the source machine as to the status of the request.

2. The method of claim 1, wherein:

said receiving receives the message as an application level signal that identifies the signal as originating with the source machine.

3. The method of claim 2, further including:

prior to said step of receiving, transmitting to the source machines an application level signal that identifies the last-hop node that is coupled to the destination machine and identifies the signal as originating from one of the last-hop node and the destination machine.

4. The method of claim 3, further including:

prior to said transmitting, sending an application level signal to the destination machine inquiring as to the identity of the last-hop node that is coupled to the destination machine and identifying the signal as originating from the source machine.

5. A storage media having computer readable code physically implementing the method of claim 4.

6. A storage media having computer readable code physically implementing the method of claim 3.

7. The method of claim 1, further including:

forwarding data from the source machine to the destination machine over the selected path.

8. The method of claim 1, wherein:

said managing a node-path database provides, for each QoS path, information on network resources upon which the QoS of the pats depend.

9. A storage media having computer readable code physically implementing the method of claim 8.

10. The method of claim 1, further including:

prior to said step of receiving, transmitting over the WAN, an inquiry addressed to the destination machine requesting identification of the last-hop node that is coupled to the destination machine.

11. A storage media having computer readable code physically implementing the method of claim 10.

12. A storage media having computer readable code physically implementing the method of claim 1.

13. A method that is machine performed by a last-hop node of a wide area network (WAN), for managing on-demand Quality of Service (QoS) assured pre-set path transmission of data from a source machine to a destination machine through the WAN, said method comprising the steps of:

managing a terminal-port database providing links between ports of the last-hop node and machines connected to the ports;

thereafter, in response to an application level message from the destination machine, transmitting identification of the last-hop node to the destination machine;

thereafter, in response to a message from the first-hop node that identifies flow information for the QoS assured pre-set path and identifies the destination machine, extracting from the terminal-port database the port linked to the destination machine and updating a flow-port table linking ports of the last-hop node to flows of QoS assured pre-set paths; and thereafter, transmitting an acknowledgement to the first-hop node that the flow-port table has been updated.

14. The method of claim 13, wherein:

the message from the first-hop node identifies the message as originating with the source machine.

15. A storage media having computer readable code physically implementing the method of claim 14.

16. A storage media having computer readable code physically implementing the method of claim 13.

17. A method that is machine performed by a source machine coupled to a first-hop node of a wide area network (WAN) and running an application that is optimized by an on-demand Quality of Service (QoS) assured pre-set path transmission of data from the source machine to a destination machine through the WAN, said method comprising the steps of:

at an application level, requesting to and receiving from the destination machine an identification of a last-hop node that is coupled to the destination machine;

sending a message to the first-hop node that includes identification of a request for a QoS assured pre-set path, identification of the destination machine and identification of the last-hop node that is coupled to the destination machine;

thereafter, receiving an acknowledgement of establishment of the QoS assured pre-set path as requested; and in response to the acknowledgement, sending the data to the first-hop node with a link to the QoS assured pre-set path.

18. A storage media having computer readable code physically implementing the method of claim 17.

19. A machine that is one of a first-hop node and a last-hop node of a wide area network (WAN), for managing on-demand Quality of Service (QoS) assured pre-set path transmission of data from a source machine to a destination machine through the WAN, said machine comprising:

a computer readable node-path database providing links between QoS assured pre-set paths through the WAN and identification of a last-hop node of each QoS path; and means for receiving from a destination terminal a last-hop node ID upon receiving a request for a QoS path, and associating the last-hop node ID and the destination terminal for pre-set paths only after there is a request for a QoS path involving the destination terminal.

20. The machine of claim 19, further comprising:

a computer readable node-path database providing links between QoS paths, the last-hop node of each path, and information on network resources upon which the QoS of the paths depend; and a computer readable flow-port table linking ports of the last-hop node to flows of QoS assured pre-set paths.

* * * * *

UNITED STATES PATENT AND TRADEMARK OFFICE
CERTIFICATE OF CORRECTION

| | | |
|---|---|---|
| PATENT NO. | : 7,215,640 B2 | Page 1 of 1 |
| APPLICATION NO. | : 10/192971 | |
| DATED | : May 8, 2007 | |
| INVENTOR(S) | : Daisuke Matsubara | |

It is certified that error appears in the above-identified patent and that said Letters Patent is hereby corrected as shown below:

Col. 4, line 16 delete "an", insert --a--

Col. 4, line 47 delete "sill", insert --will--

Col. 4, line 54 delete "MMS", insert --NMS--

Signed and Sealed this

Twentieth Day of November, 2007

JON W. DUDAS
*Director of the United States Patent and Trademark Office*